C. D. CROMLEY.
GRAIN MEASURING AND WEIGHING MACHINE.
APPLICATION FILED JUNE 18, 1907.

948,289.

Patented Feb. 1, 1910.
6 SHEETS—SHEET 1.

C. D. CROMLEY.
GRAIN MEASURING AND WEIGHING MACHINE.
APPLICATION FILED JUNE 18, 1907.

948,289.

Patented Feb. 1, 1910.

Witnesses
J. M. Fowler Jr
L. D. Morrill

Inventor
Charles D. Cromley
Mason Fenwick & Lawrence Attorneys

UNITED STATES PATENT OFFICE.

CHARLES D. CROMLEY, OF ALAMEDA, CALIFORNIA, ASSIGNOR TO AUTOMATIC PACKING COMPANY, OF SAN FRANCISCO, CALIFORNIA, A CORPORATION OF CALIFORNIA.

GRAIN MEASURING AND WEIGHING MACHINE.

948,289.

Specification of Letters Patent.

Patented Feb. 1, 1910.

Original application filed November 30, 1906, Serial No. 345,763. Divided and this application filed June 18, 1907. Serial No. 379,550.

*To all whom it may concern:*

Be it known that I, CHARLES D. CROMLEY, a citizen of the United States, residing at Alameda, in the county of Alameda and State of California, have invented certain new and useful Improvements in Grain Measuring and Weighing Machines; and I do hereby declare the following to be a full, clear, and exact description of the invention, such as will enable others skilled in the art to which it appertains to make and use the same.

This invention relates to grain measuring and weighing machines, and has for an object to provide a device of the class especially adapted for operation in association with a bagging machine and embodying new and improved features of speed, reliability and accuracy.

A further object of the invention is to provide in a weighing machine, scale pans properly suspended from scale beams and with means for discharging into the scale pan the major portion of the grain to be weighed, and with means for continuing to discharge a small amount until the exact amount is provided.

A further object of the invention is to provide in a weighing and measuring device a scale pan properly suspended and with a semi-cylinder disposed upon rotation to discharge a predetermined amount of material into the scale pan and with an opening discharging into the scale pan adapted to discharge a stream of material into the scale pan, such opening being closed by the movement of the scale pan.

A further object of the invention is to provide in a device of the class, a plurality of semi-cylinders adapted to rotate and with a feed chamber disposed between the semi-cylinders, the communication between being controlled by slides to permit the introduction of a predetermined amount of material to the semi-cylinders and means to rotate the cylinders alternately to discharge the contained amount into a scale pan disposed beneath.

A further object of the invention is to provide in a weighing device a bagging apparatus with a chute disposed to introduce material into the bagging device, and a scale pan disposed above and arranged to discharge material into the chute, the said scale pan having a trap bottom controlled by a moving part connected with the bagging apparatus.

A further object of the invention is to provide in a weighing device a scale beam supporting a scale pan in association with a bagging machine, and with means for locking the scale beam against movement while the major portion of material is being discharged into the scale pan and to unlock the scale beam to permit the movement thereof when the exact amount has been introduced into the scale pan.

With these and other objects in view, the invention comprises certain novel constructions, combinations and arrangements of parts, as will be hereinafter fully described and claimed.

In the drawings.

Like characters of reference designate corresponding parts throughout the several views.

The weighing machine forming the subject-matter of this application is a division of co-pending application No. 345,763, filed Nov. 30, 1906, for a bagging machine and is adapted especially for use in association with such a bagging machine, although it is to be understood that it may be easily adapted for use in association with another mechanism.

Figure 1:
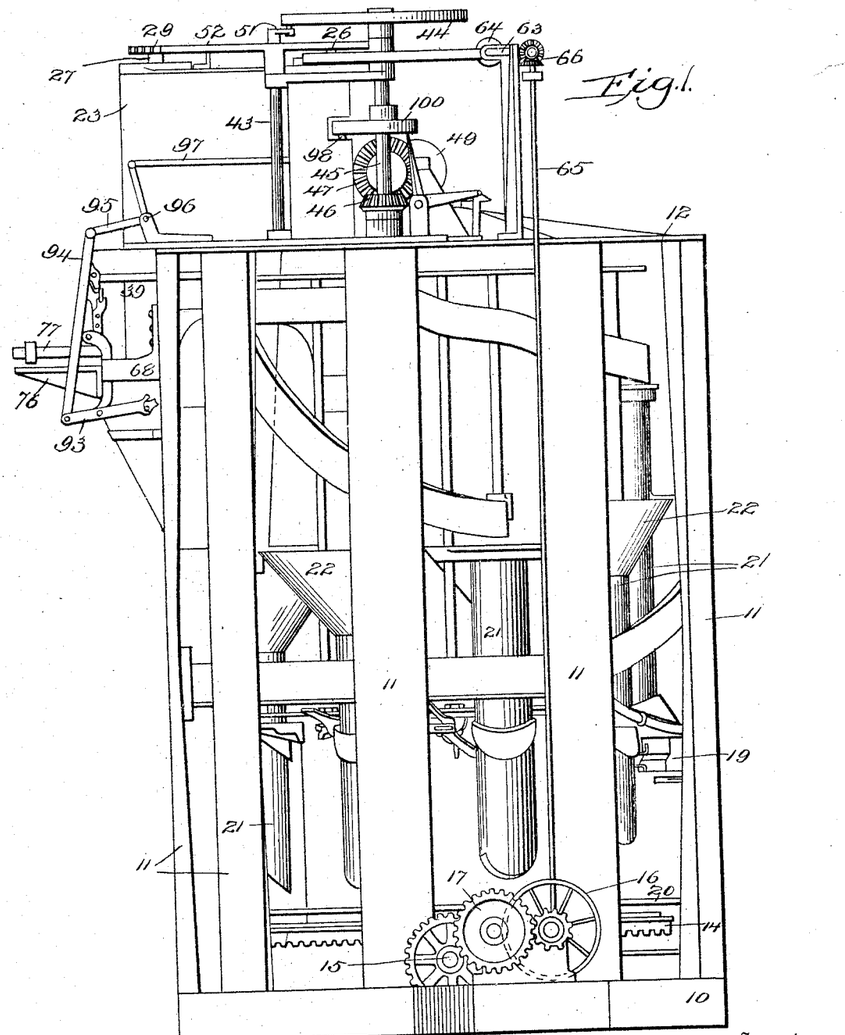
—Figure 1 is a view in side elevation of a bagging machine similar to the bagging machine forming the subject-matter of co-pending application No. 345,763, filed Nov. 30, 1906, with the weighing apparatus associated therewith.
Figure 2:
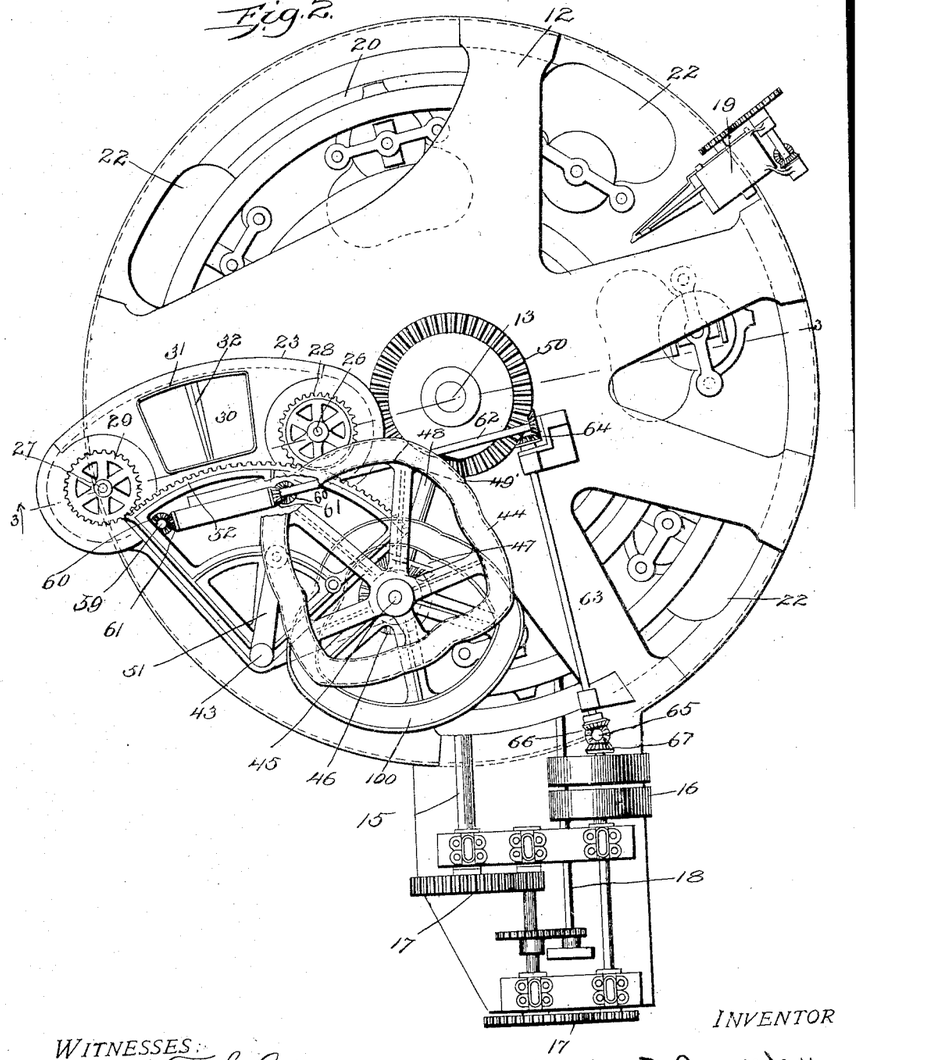
Fig. 2 is a top plan view of the bagging machine and weighing device with a plan view of the cams for operating the discharging apparatus.
Figure 3:
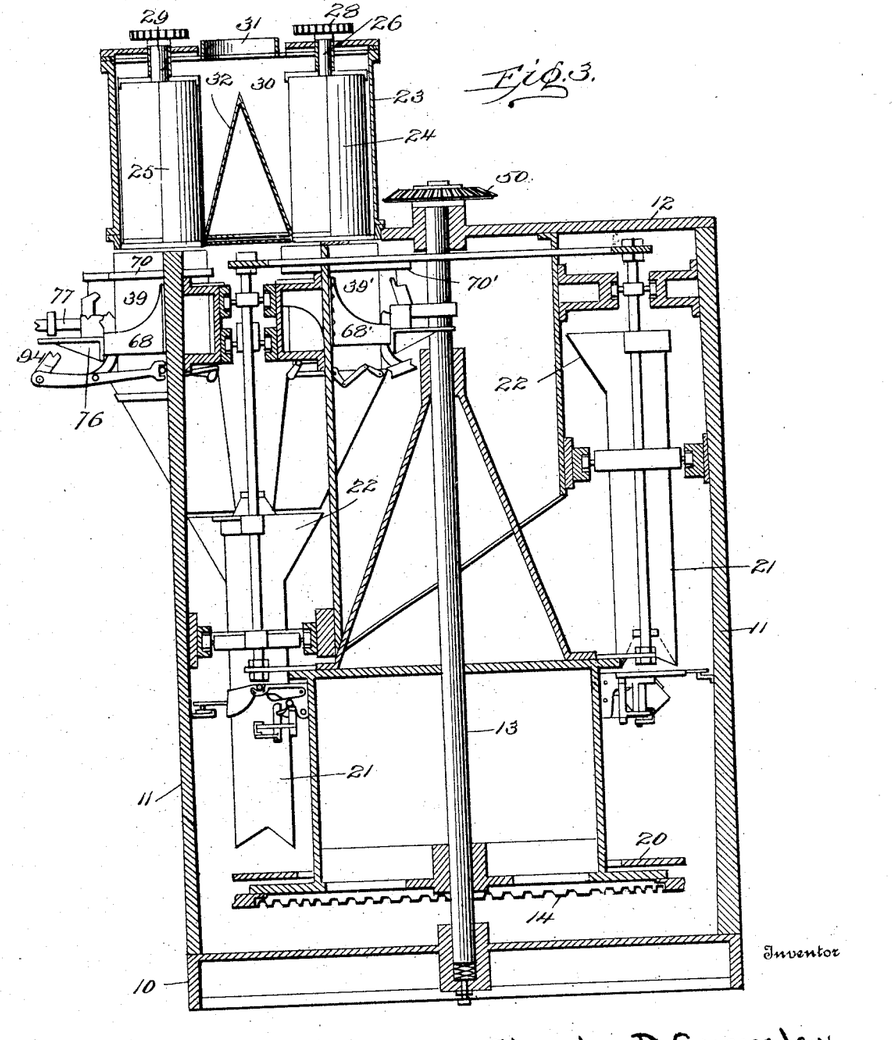
Fig. 3 is a vertical, sectional view taken on line 3—3 of Fig. 2.

The bagging machine is here shown as comprising a base 10 about the periphery of which are erected a plurality of standards 11 supporting at their upper ends a top or covering member 12 preferably built in the form of an irregular spider, as shown in Fig. 2.

Centrally upon the base 10 is erected a shaft 13. The shaft 13 is rotated in any approved manner as by a gear 14 formed about the lower end of the shaft and intergeared with a shaft 15 which receives motion from a pulley 16 through any approved train of gears, as 17. From the train of gears also extends the shaft 18 intergeared with and adapted to operate a sewing mechanism 19 which said sewing mechanism forms the subject-matter of a co-pending application No. 345,764, filed Nov. 30, 1906.

Upon the vertical shaft 13 is mounted a rotating table 20 adapted to support and carry bags while being filled by filling tubes 21, which said filling tube and their associate hoppers 22 operate in the manner described in the application of which this is a division.

At any approved point upon the top plate 12 is erected a segmental casing 23 having mounted in the opposite curved ends semi-cylinders 24 and 25 disposed with their axes parallel and vertical and rotated by means of shafts 26 and 27 respectively. The shafts 26 and 27, respectively, extend upwardly through the top of the casing 23 and are provided, respectively, with gear wheels 28 and 29. Between the semi-cylinders 24 and 25 is provided a chamber 30 supplied through an inlet passage 31 with the material employed and with a V-shaped or conical baffle 32 having its apex angle disposed upwardly and inclined downwardly to guide material from the opening 31 from the opposite sides and to the semi-cylinders 24 and 25. Between the chamber 30 and the semi-cylinders are also mounted sliding plates 33 and 34 extending upwardly through the top of the casing 23 and movable to permit a predetermined amount of material to flow beneath the said plates and into position for engagement by the semi-cylinders 24 and 25.

The bottom ends of the semi-cylinders 24 and 25 are open provided with spiders 35 and 36 and with openings 37 and 38 in the bottom of the casing 23 conforming substantially to the diameter of the semi-cylinders.

Beneath the openings 37 and 38 are disposed scale pans 39 and 39' and a segmental plate 40 provided at its ends with openings 41 and 42 corresponding substantially in curvature with the openings 37 and 38 in the casing 23. The segmental plate 40 is rigidly mounted upon a shaft 43 journaled upon the top plate 12 in substantial parallelism with the shaft 13.

The shaft 43 is given an oscillatory movement by means of a cam wheel 44 carried upon the upper extremity by a shaft 45, which said shaft 45 is also mounted in parallelism with the shaft 43 and 13. The shaft 45 receives motion from the shaft 13 by means of a pinion 46 mounted upon the shaft 45 and engaging a beveled gear 47 carried upon a shaft 48 which said shaft 48 also carries a pinion 49 intergeared with a gear 50 carried upon the upper extremity of the shaft 13.

The shaft 43 receives motion from the cam 44 by means of a crank arm 51 interengaging with the said cam wheel 44 and upon the said shaft 45 in addition to the segmental plate 40 is also mounted a segmental gear 52 engaging with the gears 28 and 29 and from which the said gears receive motion. It will thus be seen that the segmental plate 40 and the semi-cylinders actuated by the gears 28 and 29 move in timed relation. The bottom of the casing 23 is also provided with openings 53 and 54 disposed immediately above a segmental opening 55 in the plate 40, so that both of such openings continuously register with such segmental opening. Above the openings 53 and 54 are disposed agitators 56 and 57 mounted upon the shafts 58 and 59, which said shafts extend upwardly through the top of the casing 23 and are provided with gears 60 intergeared with gear 61 mounted upon shaft 62, and from which the agitators receive rotary motion. The shaft 62 is intergeared with a shaft 63 through the gears 64 which, in turn, is intergeared with a shaft 65 extending vertically without the lines of the machine, such intergearing being accomplished by means of gears 66 and the shaft 65 receiving motion from the pulleys 16 through the medium of gear 67, from which it will be readily apparent that the agitators 56 and 57 are constantly rotated.

The scale pans 39 and 39' are suspended within frames 68 and 68' carried rigidly by the uprights 11 and provided with knife edges 69 and 69' supporting frames 70 and 70'. The frames 70 and 70' are, respectively, provided with knife edges 71 and 71' engaging blocks 72 carried upon the upper edge of the scale pans 39 and 39'. As the scale pans 39 and 39' and their respective associate parts are similar each to the other, but one will need be described, it being understood that the reference characters applied to such description apply to similar reference characters applied to the other scale devices and provided with prime marks. The scale pan is also provided with a knife edge 73 engaging a notch in the lower side of the frame piece 68 by means of which swinging movement of the scale pan is prevented when the scale pan is at its upper extremity.

The scale pan is preferably provided in one corner with a plate 74 providing an auxiliary or smaller chamber 75 beneath and registering with the openings 53 and 54 under the agitators 56 and 57 so that material discharged through the said openings 53 and 54 is discharged into the auxiliary chamber 75 instead of into the main chamber of the pan 39.

Extending outwardly from the bracket member 76, upon which is mounted a scale beam 77 by means of the knife edge 78 and provided with the usual limiting stops and screws 79 and 80. The scale beam 77 is also provided with an upwardly extending right-angular off-set portion 81 upon which the frame 70 bears by means of a bar 82 disposed between the said off-set portion 81 and an outwardly extending arm 83. It will be observed that the off-set portion 81 is disposed upon the opposite side of the knife edge 78 from the counter-balance 84, so that the weight of the scale pan 39 bearing upon the frame 71 is transmitted through the arm 83 to the off-set portion 81 to raise the counter-balance 84 when the material in the pan is of sufficient weight. Upon the bracket 68 are also mounted curved arms 85 forming a bearing in which is journaled a shaft 86 extending transversely across above the scale beam 77 and upon which is mounted a bell-crank lever 87 having a pin or stud 88 positioned to bear upon the top of the scale beam and lock it in depresed position. The curved arms 85 also serve to journal a transverse shaft 89 disposed below the arm 76 and in parallelism with the bar 86 and upon which is mounted an arm 90 engaging with and operating the bell-crank lever 87 by means of a slot 91 and interengaging pin 92. Upon the shaft 89 is also mounted an arm 93 connected by means of a link 94 with a bell-crank lever 95 pivoted at 96 upon the top plate 12 which said bell-crank lever 95 communicates also by means of a link 97 with a lever 98 pivoted at 99 and with its upper end in engagement with a cam 100 carried upon the shaft 45 below the cam wheel 44. It will thus be seen that as the cam wheel 100 rotates with the shaft 45 the lever 98 is moved upon its pivot 99 and the arm 93 and shaft 89 consequently moved rotatably. The movement of the shaft 89 will, as will be seen, move the arm 90 to alternately lock and release the scale beam 77 by means of the pin 88 bearing upon the top thereof and moving in timed relation the said scale beam is released after material is discharged from the semi-cylinders 24 and 25 from the scale pan such locking being provided to prevent the movement of the scale pan under the impact of the large quantity of material discharged into the pan. After the material is discharged into the pan, as above described, the scale beam is released and material continues to flow through the openings 53 and 54 into the compartment 75 until the proper amount of material has been introduced into such auxiliary chamber to move the scale pan whereby the movement of the said beam also moves the auxiliary arm 101 carried by the knife bar 78 which is provided with abutments 102 and 103 adapted when moved with the scale beam 77 to engage the lower end 104 of a lever pivoted at 105, the upper end of which engages a link 106 which in turn engages a closure 107 beneath the openings 53 and 54. The lever 104 is carried by an arm 104' extending outwardly from the base of the casing 23 and with a return portion of such arm providing accommodation for pin 105 for said lever 104. It will thus be seen that when the scale beam is moved by reason of the introduction of material into the auxiliary chamber 75, the abutment 102 will engage the lever 104 and move the closure 107 to cut off the further flow of material.

Figure 4:
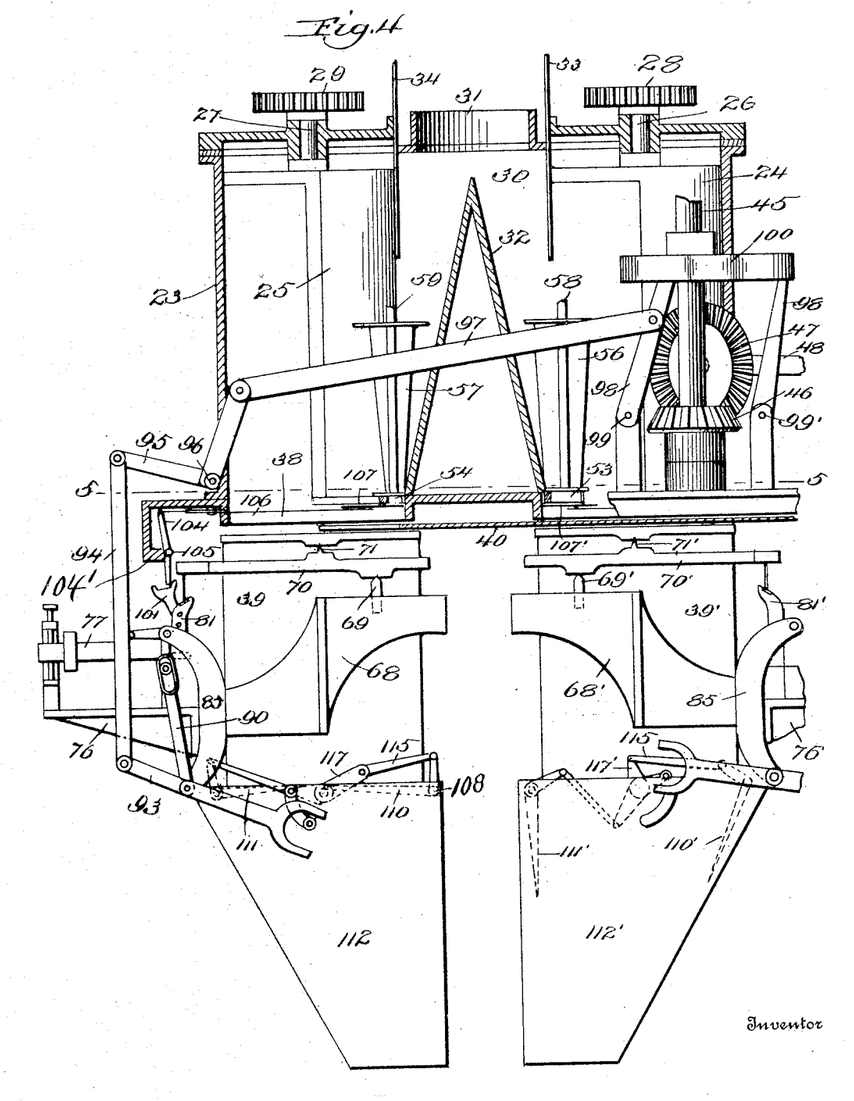
Fig. 4 is an enlarged detail sectional view of the weighing device taken on a plane substantially corresponding with the plane of Fig. 3.
Figures 5, 7:
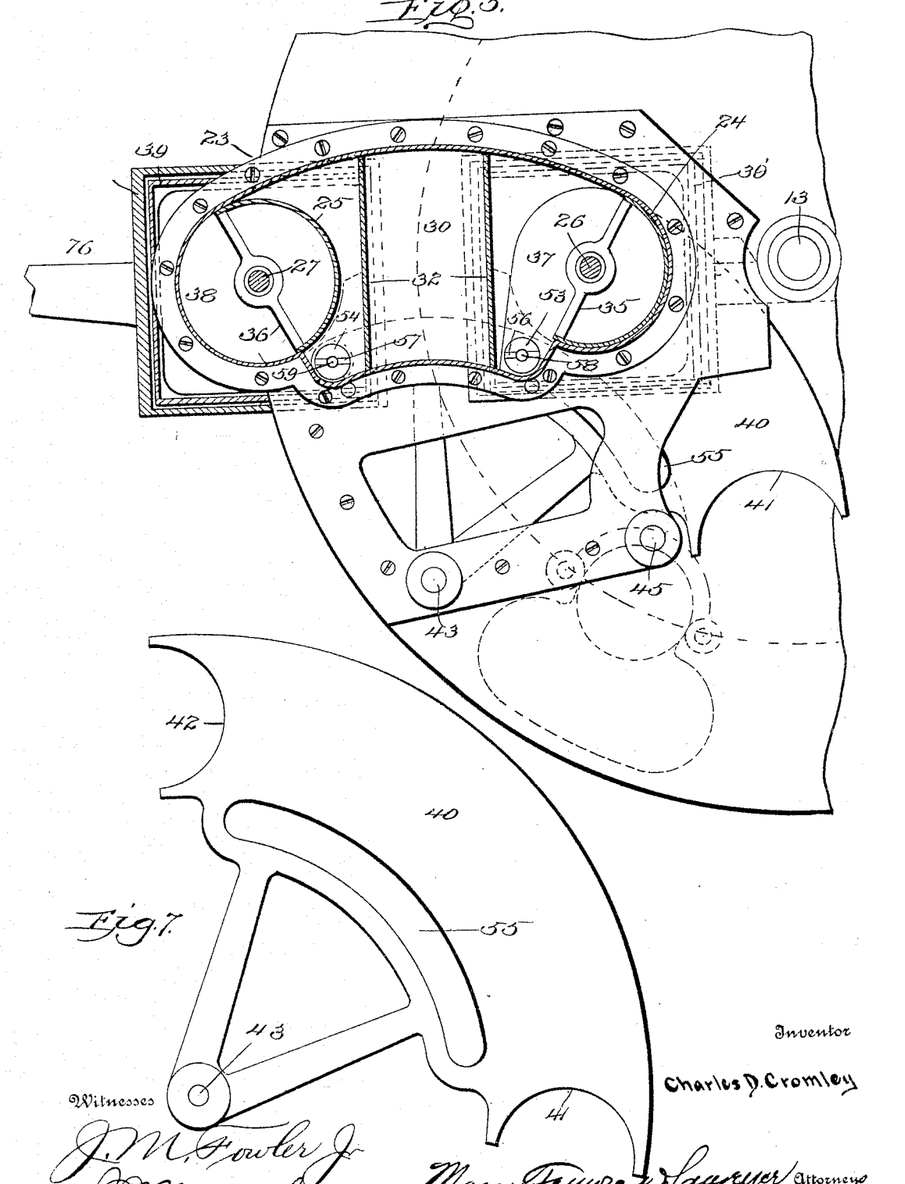
Fig. 5 is a horizontal, sectional view taken on line 5—5 of Fig. 4.
Fig. 7 is a top plan view of the segmental plate adapted to close the discharge opening from the semi-cylinders.

Upon the under side of the scale pan 39 which is normally open throughout its entire area, are mounted rock shafts 108 and 109 to which, respectively, are secured trap bottom closures 110 and 111 which upon opening downwardly fall within chute 112 leading to the hopper 22. The rock shafts 108 and 109 are respectively provided with crank arms 113 and 114 rigidly upstanding from the said shafts and communicating respectively by means of links 115 and 116 with a rocker 117 pivoted as at 118 to the scale pan and controlled by means of a stud 119 engaged between the bifurcated ends 120 of a lever 121, carried also rigidly upon the shaft 89 and operated therewith by means of the link 94 and associated parts from the cam wheel 100. It will be noted that the interval between the bifurcated ends 120 is considerably greater than the diameter of the stud 119 so that as the shaft 98 is moved a slight distance under the impetus from the cam wheel 100, the scale beam 77 and the stud 119 are simultaneously released from all contact, whereby the scale pan and its associated parts swing free from engagement, except through the medium of the regular knife edges adapted to support the same and the lower knife edge 73 adapted to prevent a swinging movement thereof. Such position of absolute release is maintained while material is being discharged through the openings 53 and 54 into the chamber 75 and until the proper amount of material has been discharged into the scale pan to actuate the beam, and the flow of material cut off. The cam wheel 100 then further actuates the arm 121 to raise it to the position shown at the right-hand in Fig. 4, which throws the rocker 117 out of locking position and releases the trap bottoms 110 and 111 to discharge material into the chutes 112 and 112'.

The scale is adapted to measure, weigh and discharge any predetermined amount of material, such amount being definitely determined by fixing the counterpoise or weight 84 at the desired position and a large percentage of the material is discharged almost instantaneously into the scale pan by means of one of the semi-cylinders, the amount being regulated by means of the slides 33 and 34 so that the material so instantaneously discharged will approximate ninety or ninety-five per cent. of the entire material, the remaining five or ten per cent. then being made up by the limited discharge through the openings 53 and 54.

It will be understood that it is impossible to measure material in the manner described in the operation of the semi-cylinders to introduce the exact weight at each instance, so the mechanism is adjusted to discharge nearly the entire amount, but less than the whole amount in each instance, the remaining smaller portion being made up as described by the flow through the auxiliary openings.

Upon the shaft 45 the cam wheel 44 is mounted operating by means of the crank arm 51 and segmental gear 52. The segmental gear 52 meshing with the gears 28 and 29 move the shafts 26 and 27 and the semi-cylinders 24 and 25 rotatably alternately in opposite directions. The material to be weighed is discharged through the opening 31 in any approved manner and by the plate 32 is deflected toward the opposite ends of the casing 23. The controlling plates 33 and 34 determine how much of the material is admitted to the semi-cylinders 24 and 25, such plates being movable vertically to control the opening between the chamber 30 and the opposite semi-cylinders. As the semi-cylinders oscillate under the action of the segmental gear 52 the open side is alternately brought into position to receive material from the chamber 30 and over the opening discharging into the scale pan 39. In this manner the contents of the semi-cylinder, when such semi-cylinder is rotated, is dumped through such opening into the scale pan and when such dumping is in progress the closed side of the semi-cylinder closes the opening 21 and shuts off passage from the chamber 30. While one semi-cylinder is discharging the other semi-cylinder is in position to receive a charge from the chamber 30.

It is intended to so regulate the plates 33 and 34 that a very large portion of the material required is dumped from the semi-cylinder to the scale pan at each dump, but as the material cannot be gaged accurately in such manner auxiliary means is provided in the openings 53 and 54. Above these openings the agitators 56 and 57 are journaled with the shafts 58 and 59 extending upwardly through the top of the casing 23 and provided upon their upper ends with gears 60 shown particularly in Fig. 2 which gears are intergeared with gear 61 mounted upon the shaft 62 and receiving motion from the shaft 63 as described. The gear 60 upon the upper end of the shaft 58 is not shown in Fig. 2 as it is covered by the segmental gear 52 and the cam 44, but is similar in all respects to the gear 60 showing upon the top of the shaft 59. These agitators 56 and 57 are constantly agitated to insure the passage of a smaller quantity of material through the passages into the auxiliary chamber 75 of the scale pan, such auxiliary chamber is provided to prevent the discharge of material from the semi-cylinder filling the corner and preventing the free flow of material to the pan.

Beneath the openings 53 and 54 the plates 107, 107' are mounted operatively by means of the rods 106 connected with the lever 104.

Figures 6, 8:
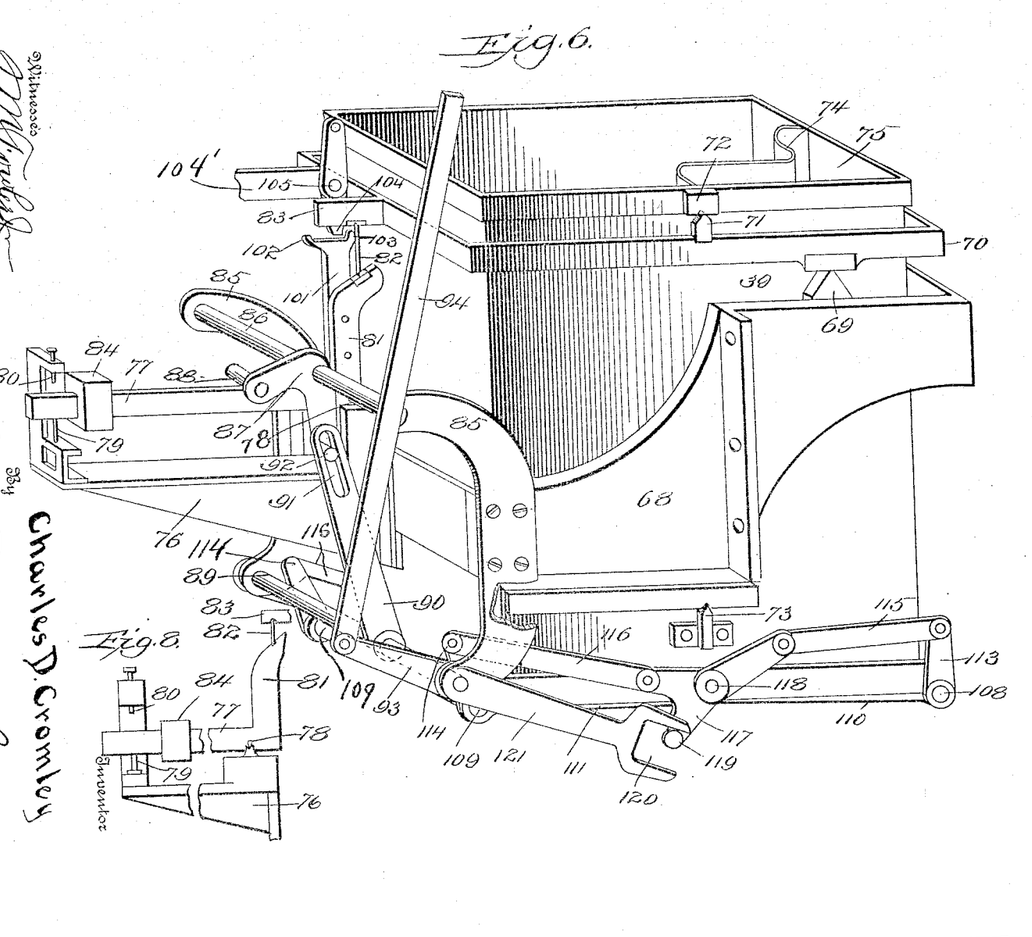
Fig. 6 is a detail perspective view of one of the scale apparatus.
Fig. 8 is a detail view of the scale beam and associated parts shown broken.

Before the material is dumped from the semi-cylinder the scale beam 77 is locked by means of a pin 88 bearing upon the upper side thereof to prevent the operation of said scale beam and the associated parts by reason of the impact of the material dumped. When the material has been dumped the cam 100 operating in timed relation with the dumping moves the link 97 and through the intermediate leverage operates the arm 93 so that the fork 120 is moved upwardly a distance and the shaft 89 rotated to such an extent that the arm 90 moves the bell-crank lever 87 to unlock the scale beam. Following or coincident with this the openings 53 or 54 are opened and material discharged through said openings into the scale pan. When the exact weight required has been delivered to the pan the rising of the scale beam moves the integral lever 81 and the connected lever 101 and the movement of the latter lever operates the lever 104 to close the opening 54 and cam 100 further moves the arm 93 to unlock the hinged bottom comprising the winged sections 110 and 111 permitting the material to drop into the chutes 112. It is to be understood that the unlocking of the hinged bottoms and the subsequent dumping of the contents is timed to allow the full weight to be made up by the auxiliary feed some time before the dumping takes place. As soon as the material is dumped the further rotation of the cam 100 operating through the levers and links closes the winged sections 110 and 111, locks the scale beam 77, all as shown in Fig. 6, whereupon the device is ready to receive another charge from the semi-cylinders.

This constitutes one complete operation of the device and the rotation of the table carrying the bag is immaterial to the operation of the measuring device and the weighing device, except that such operation brings bags into proper sequence mounted upon their proper filling tubes beneath the chutes 112.

What I claim is:—

1. In a device of the class described, a scale embodying a scale pan, bottom sections hinged at opposite edges of the scale pan, arms secured to the hinges of the bottom sections, a rocker carried by the pan, links pivotally engaging the rocker and arms and arranged to lock the sections in closed position, means to actuate the rocker to unlock the sections, a scale, a scale beam, means to lock the scale beam in depressed position, means to discharge a predetermined quantity of material into the scale, means to unlock the scale beam following the discharge of material, means to discharge a smaller quantity of material into the scale, and means actuated by the scale for shutting off the flow of material when the proper weight is reached.

2. In a device of the class described, a part rigidly supported and provided with a knife edge, a frame carried partly upon the knife edge, a scale beam fulcrumed upon the rigidly supported part, means to connect the scale beam and frame whereby the frame is supported partly from the beam, a scale pan disposed within the frame, and means permitting a discharge of material from the pan.

3. In a device of the class described, a bracket rigidly supported and provided with upstanding knife edges, a scale beam fulcrumed upon the rigidly supported part, a frame supported partly upon the knife edges a scale pan disposed within and supported from the frame, means to lock the beam against displacement, bottom sections hinged to the lower side of the scale pan, and means to unlock the scale beam and the bottom sections.

4. In a device of the class described, a casing, independent semi-cylinders vertically journaled within the casing, a feed chamber disposed adjacent the peripheries and in communication with the semi-cylinders, movable means disposed between the chamber and the semi-cylinders and adapted to close predetermined portions of the openings, a scale, means to discharge material from the semi-cylinders into the scale, and auxiliary feeding means disposed within the casing and arranged to feed small quantities of material to the scale.

5. In a device of the class described, a casing, means disposed within the casing for measuring and discharging large quantities of material, a scale disposed beneath the casing, a plate arranged to close communication between the casing and the scale, means to move the plate to permit discharge of the material from the measuring device to the scale, auxiliary means for discharging small quantities of material from the casing to the scale all operating automatically and in timed relation, and means actuated by the scale for closing the auxiliary discharge means.

6. In a device of the class described, a casing, a measuring device disposed within the casing and adapted to discharge a considerable quantity of material at one discharge, a scale disposed beneath the measuring means and adapted to receive material therefrom, auxiliary discharge openings formed in the bottom of the casing and in communication with the scale, agitators disposed within the casing and adapted to insure the continuous flow of material through the auxiliary openings all operating automatically and in timed relation and means actuated by the scale adapted to close the auxiliary opening.

7. In a device of the class described, a scale pan, trap bottoms hinged to the under side of the said scale pan, a rocker adapted to lock the trap bottoms in closed positions, an arm adapted to release the rocker, and means for actuating the arm.

8. In a device of the class described, a scale pan, trap bottoms hinged upon opposite edges of the scale pan, and meeting at the center, a rocker pivoted to the scale pan, links connecting the rocker with and in association with the said rocker to lock the said trap bottoms, a pivoted arm adapted to actuate the rocker and release the trap bottoms, and means to actuate the arm.

9. In a device of the class described, a scale comprising a scale beam and scale pan, trap bottoms provided for the under side of the scale pan, a rocker pivoted upon the scale pan and adapted to lock the trap bottoms in closed position, means to lock the scale beam in depressed position, and means to release the scale beam and the trap bottoms.

10. In a device of the class described, a scale comprising a scale beam with a scale pan supported thereupon, trap bottoms provided for the scale pan, a rocker pivoted upon the pan and adapted to lock the trap bottoms in closed positions, an arm positioned to lock the scale beam in depressed position, and means to simultaneously actuate the beam and bottom locking means.

11. In a device of the class described, a scale comprising a scale beam, a scale pan supported thereupon, trap bottoms provided for the scale pan, a rocker pivoted upon the scale pan and adapted to lock the trap bottoms in closed positions, an arm adapted to lock the scale beam in depressed position, an arm adapted to actuate the rocker, means adapted to release the beam locking and rocker actuating arms simultaneously, and means to move the rocker actuating arm a further distance to release the trap bottoms.

In testimony whereof I affix my signature in presence of two witnesses.

CHARLES D. CROMLEY.

Witnesses:
C. A. WOODRUFF,
HENRY E. CURZON.